July 6, 1965     H. BARUCH ETAL     3,193,359
APPARATUS FOR CONDUCTING ANALYTICAL PROCEDURAL STEPS
Filed July 2, 1962     5 Sheets-Sheet 1
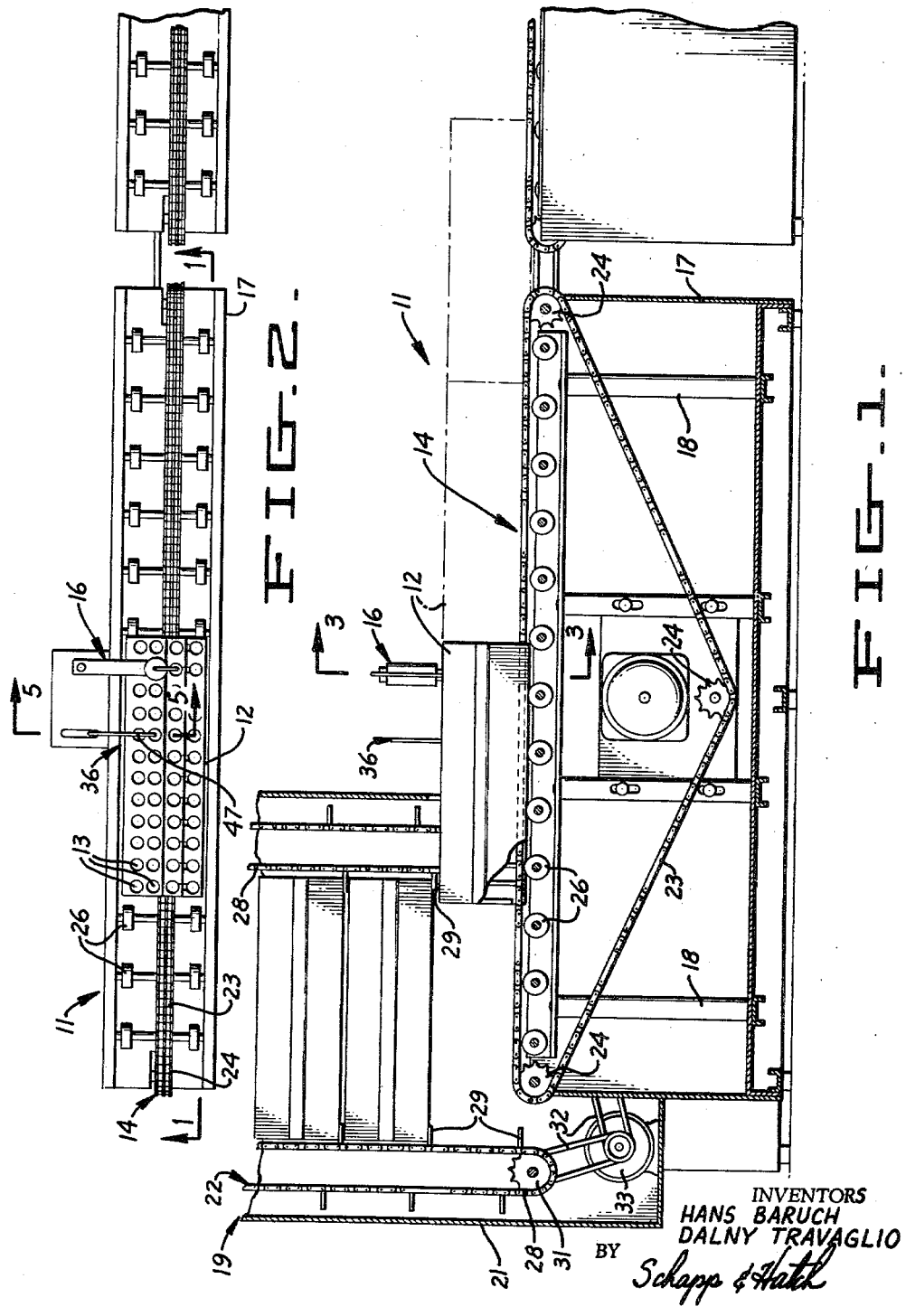
INVENTORS
HANS BARUCH
DALNY TRAVAGLIO
BY Schapp & Hatch
ATTORNEYS

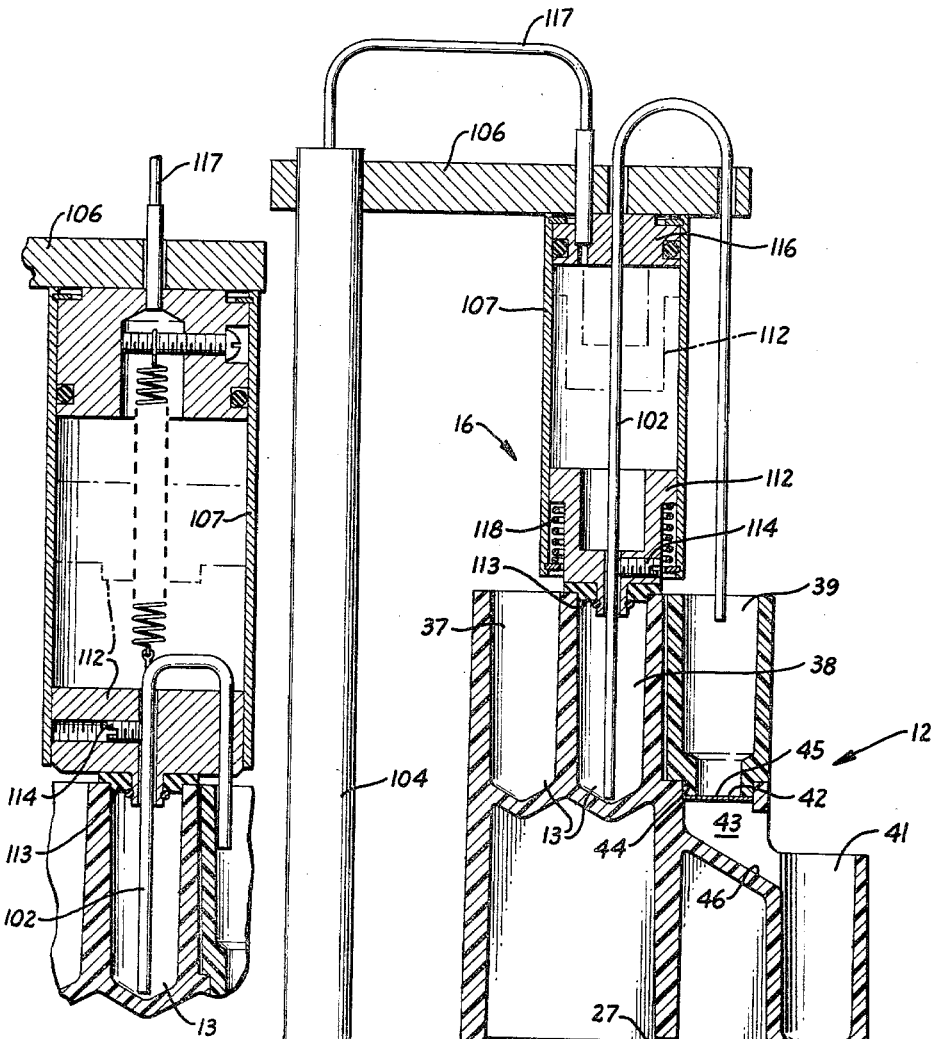
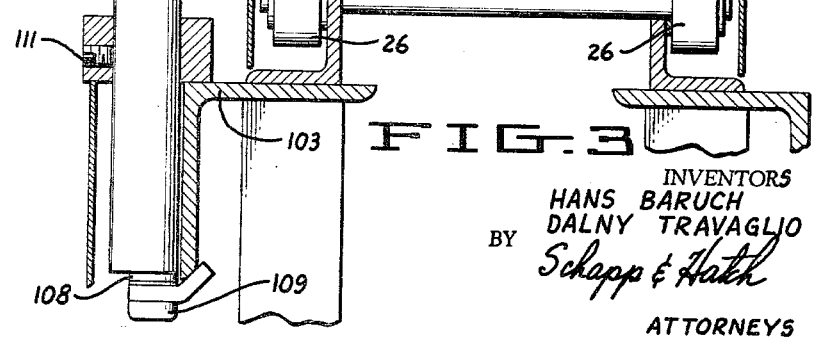

INVENTORS
HANS BARUCH
DALNY TRAVAGLIO
BY Schapp & Hatch
ATTORNEYS

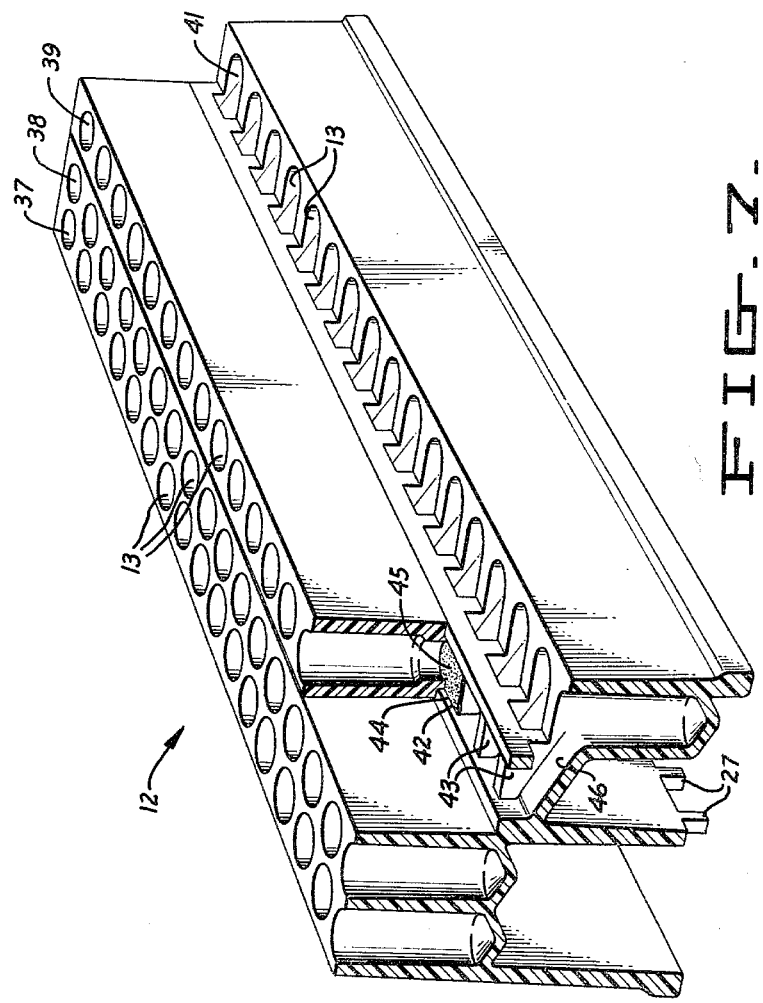

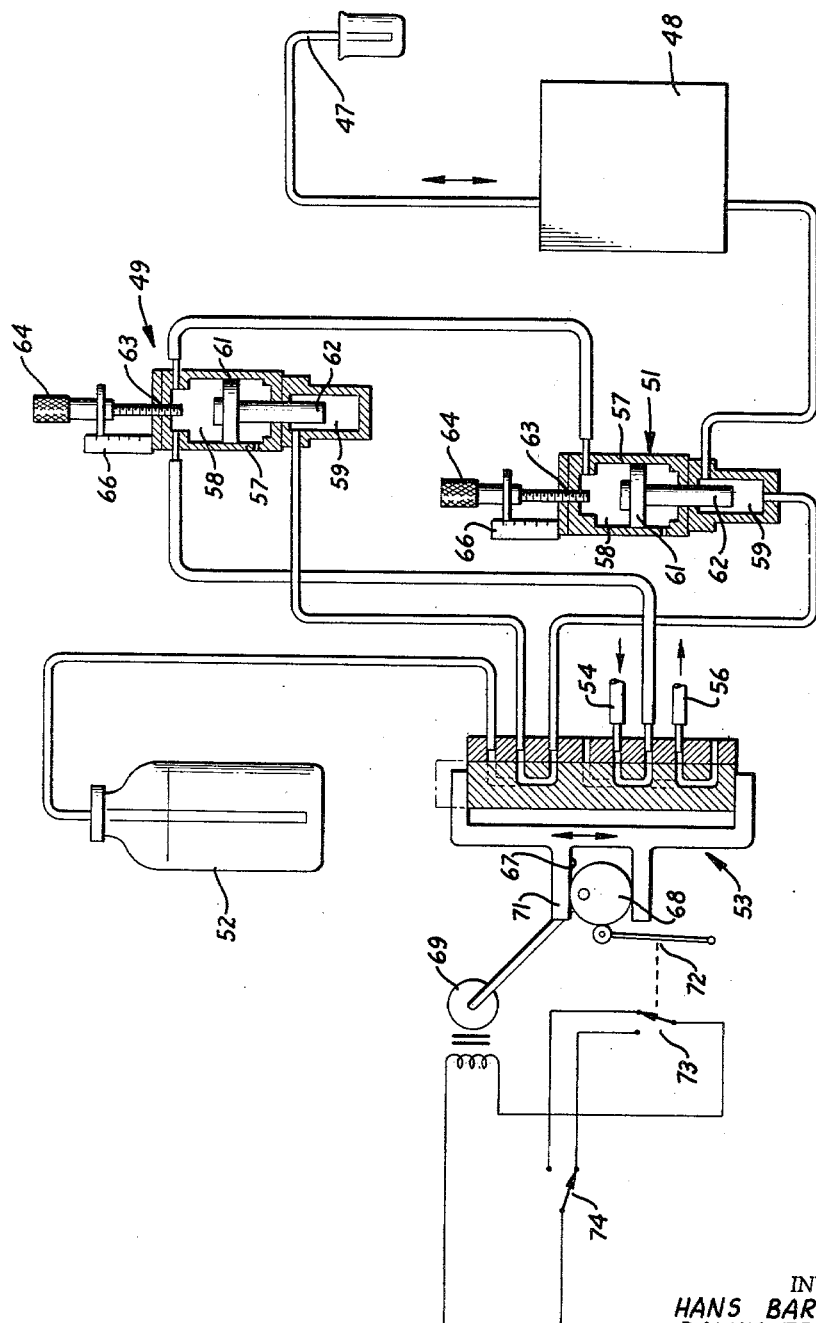

United States Patent Office 3,193,359
Patented July 6, 1965

3,193,359
APPARATUS FOR CONDUCTING ANALYTICAL PROCEDURAL STEPS
Hans Baruch, Berkeley, and Dalny Travaglio, Kensington, Calif., assignors, by mesne assignments, to Warner-Lambert Pharmaceutical Company, Morris Plains, N.J.
Filed July 2, 1962, Ser. No. 207,123
15 Claims. (Cl. 23—259)

The present invention relates to improvements in an apparatus for automatically conducting analytical procedural steps, and more particularly to such an apparatus capable of carrying out the steps of chemical procedures exactly as they would be carried out by the technician.

Many types of chemical analyses require the processing of a great number of samples of similar character. The repetitive performance of similar operations lends itself to automation, and the use of automatic analyzing equipment can result in a material savings in the time of the operator. In addition, the automated equipment provides more uniform procedures with greater accuracy and greater economy through the unattended operation.

However, it is important to use definite fixed analytical procedures for carrying out the analyses, and these procedures are carefully worked out to provide a standard which is of value to the person interpreting the analytical results. Accordingly, it is important to adhere to the standards, and therefore certain steps which have been difficult to automate in simple equipment must be automated in order to achieve the objectives of the present invention.

It is also important to carry out these procedures as rapidly as possible without departing from the required standards. Accordingly, it is desirable to provide an apparatus capable of achieving both of these aims, as well as other advantages.

In accordance with the present invention, we have provided an apparatus capable of carrying out analytical steps according to the procedures which are substantially the same as procedures heretofore accomplished by laboratory technicians, and which operates rapidly and efficiently. The apparatus is designed and constructed in such a way that the samples are advanced through a series of sample stations in equally timed intervals, and the time between operations is adjusted by adjusting the location where the operation is carried out. Examples of the operations that may be carried out include measuring and transferring samples by the use of pipettes or similar devices, the addition of reagents, carrying out reactions under carefully controlled conditions, providing separation of liquids and solids such as filtration, and transferring the treated solution to other containers where the desired final determination may be carried out automatically, with the operations conducted in timed sequence. Accordingly, the machine can be programmed to operate according to any known standard analytical procedure.

In addition, the apparatus is adapted to be combined with other analytical devices to provide a complete analysis. In particular, the apparatus is designed to provide the preliminary treatments of the samples, and to provide a change in a physical property which is measured in a suitable device to obtain the analyses required.

Certain analytical procedures are suitable for being conducted in a machine which moves the samples in a cyclic path, and the machine may be self-cleaning for continuous operation. Such a machine is the subject of our copending application filed concurrently herewith, and entitled Apparatus for Performing Analytical Procedures. In that invention, a turntable is utilized to carry samples through a plurality of indexed sample sites and carry out certain treatments. However, it is also possible to provide a device in which the samples are conveyed linearly through a group of sample sites, and this linear movement is of advantage where the steps to be carried out require apparatus not easily cleaned for use of certain components, and require replacement of same. For example, in certain filtering operations it is desirable to provide a new filter for each determination and to discard precipitate filter paper or other filtering means used between runs. Accordingly, the present apparatus is particularly suitable where a filtering step is combined with the other treatments being carried out.

Thus, in accordance with the present invention, an apparatus is provided which is loaded with samples at one end, and which carries the samples through equally spaced stations at equal time intervals where certain desired treatments are effected, and geometrically timed by their positioning to provide carefully controlled analytical procedures. And then the means for carrying the sample and any means associated therewith for effecting the necessary treatments are carried to the end of the linear path and removed so that they may be cleaned or otherwise renovated for reuse. The linear path may be a straight line or curved, or move in any path desired; however, it should have a beginning and an end position.

Accordingly, it is the primary object of the present invention to provide an automatic analytical apparatus adapted to carry out certain of the complex operations utilized in standard analytical procedures, and which apparatus may be combined with other components necessary to provide all of the required analytical steps for automatically accomplishing an entire analysis.

Another object of the present invention is the provision of an automated analytical apparatus of the character described which is versatile and may be easily programmed to carry out the number of analytical procedures, the apparatus being flexible as to the sequence in which the various steps are carried out and the timing or duration of each opeartion.

A further object of this invention is to provide an automatic analytical apparatus capable of carrying out programmed procedures in a linear fashion, including the steps of transferring measured quantities of liquids without undue contamination by previously handled materials, and to effect separations of solids and liquid components.

A still further object of the present invention is to provide an automatic analytical apparatus of the character described which will maintain the samples in a sequential relationship with respect to the other samples during the entire operation, so as to make each individual sample readily identifiable at all times.

Still another object of this invention is to provide an automatic analytical apparatus of the character described which is fabricated from materials capable of long, useful operation even in the presence of corrosive liquids, and which contains pumps for moving liquids which are pressure operated.

Further objects and advantages of our invention will appear as the specification continues, and the new and useful features of our automated analytical apparatus will be fully defined in the claims attached hereto.

A preferred form of our invention is illustrated in the accompanying drawings, forming part of this description, in which:

FIGURE 1 is an elevational view of an apparatus constructed according to the invention as seen substantially in the plane of line 1—1 of FIGURE 2;

FIGURE 2 is a plan view of certain of the apparatus shown in FIGURE 1;

FIGURE 3 is a sectional view illustrating a transfer mechanism utilized in the invention as seen in the plane of line 3—3 of FIGURE 1;

Figures 5, 6:
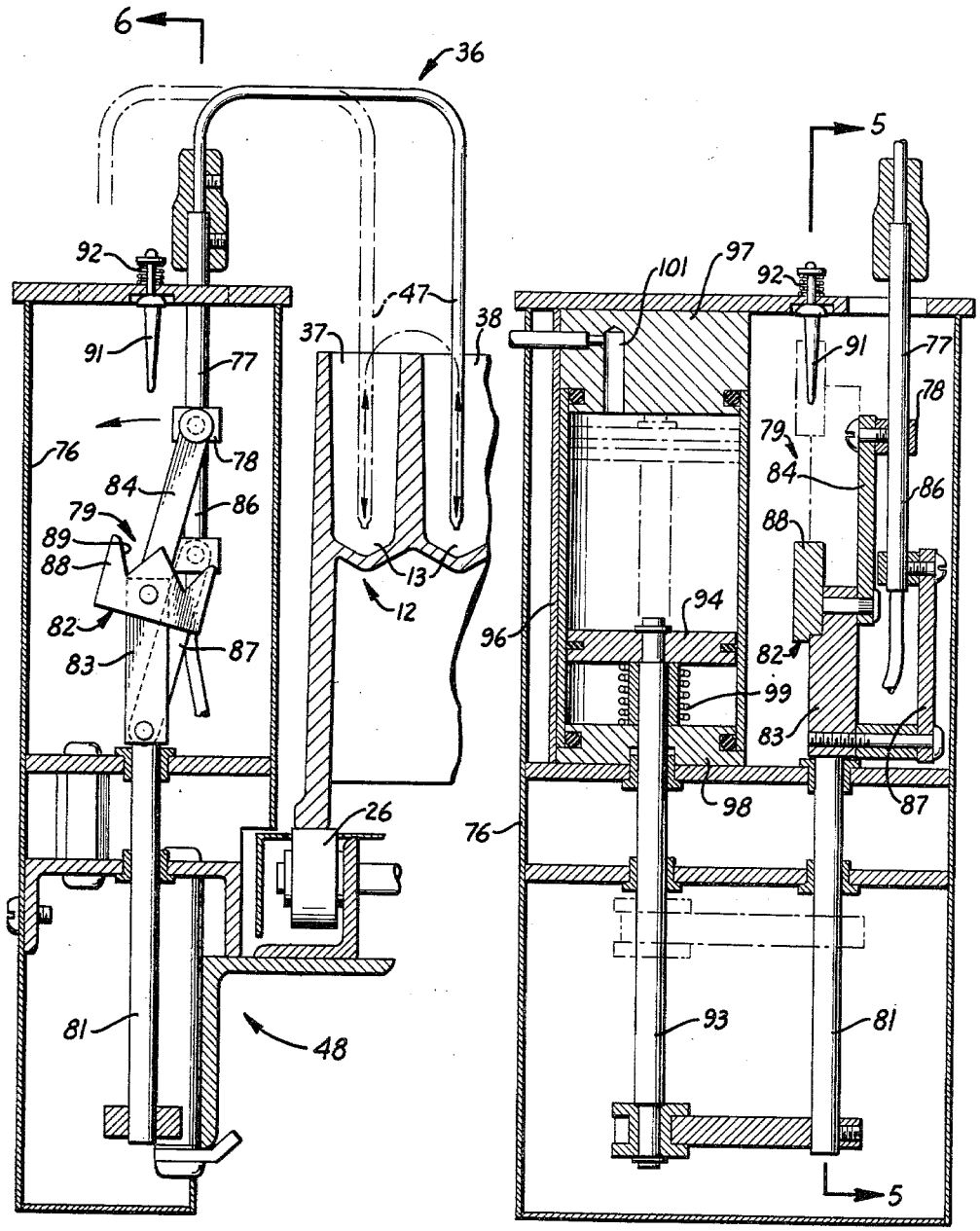

FIGURE 4, a sectional view illustrating an alternative form of the transfer device shown in FIGURE 3;

FIGURE 5, a cross-sectional view illustrating another transfer mechanism utilized in the invention as seen in the plane of line 5—5 of FIGURE 2;

FIGURE 6, a cross-sectional view of the transfer mechanism illustrated in FIGURE 5 as seen in the plane of line 6—6 thereof;

FIGURE 7, a perspective view of a preferred sample holding device which may be used in carrying out the present invention; and FIGURE 8, a schematic view illustrating a preferred pumping system for transferring a measured quantity of sample together with a measured quantity of reagent from one location to another, which is used in the present invention.

While we have shown only the preferred forms of our invention, it should be understood that various changes or modifications may be made within the scope of the claims hereto attached, without departing from the spirit of the invention.

Referring to the drawing in greater detail, there is shown in FIGURES 1 and 2 an apparatus 11 for automatically conducting analytical procedural steps comprising a plurality of tube racks or block units 12, each unit having a pulrality of contianers 13 arranged in rows, conveying means 14 for conveying said block units and associated containers lineraly through the system according to a fixed predetermined motion, and a transfer device 16 for moving treated samples from containers 13 in one row to containers 13 in another row in position for filtering the samples.

As here shown, the apparatus 11 comprises a housing 17 having suitable supports for conveying means 14 which carry the block units linerally through the desired positions where the analytical treatments are effected. In order to move a plurality of block units in preparation for handling of the system by conveyor means 14, there is provided a feeding section 19 comprising a housing 21 and conveying means 22 for conveying the units into position on conveying means 14 in a vertical manner which is synchronized with the movement thereof, and provides orderly feeding onto the conveyor 14. By using this feeding section, the operator can supply 15 or more tube racks or block units, and thereby present 150 or more samples to the apparatus before any further attention is required.

The tube racks 12 are moved through the system in a manner in which each successive container is moved stepwise into position and held there for an adjustably fixed period of time. The alternative on and off movement of the conveyor may be provided by any conventional means for obtaining such a uniform intermittent drive. In this way, an operation is geometrically timed by spacing the associated equipment which begins and terminates the operation the desired number of stations apart.

In the embodiment shown in FIGURES 1 and 2, the conveyor 14 comprises an endless belt or chain 23 which is driven by sprocket 24 and carried on rollers 26. Rollers 26 are journaled for rotation in housing 17 and act as idler rollers used to support the tube racks 12 at 25 to maintain the racks in a flat or horizontal position as they are carried horizontally through the system. Tube racks 12 are provided with lugs 27. (see FIGURE 7), which lugs are evenly spaced from each other and centrally located for meshing with the openings in the endless chain 23. For example, chain 23 has spaces evenly disposed throughout its length and lugs 27 of the tube racks are gripped in these spaces so as to provide a positive drive by the chain, and positively transfer movement of the chain to movement of the tube racks.

Thus, it is important that the tube racks coming from the feeding section 19 be brought into proper position so as to provide a continuous group of tube racks fitting together to provide a continuous line of sample containers, each of which are evenly spaced. Thus, the feeding section 18 comprises a vertical conveyor chain 28 having supports 29 disposed to hold the tube racks to be fed from above the feeding end of conveying means 14. When a tube rack passes through conveying means 14 to a position whereby the space is such that another tube rack may be set down next to it, relay means or other such automatic activaitng devices indexed with or responsive to the movement of the racks, causes the motor 33 to operate and drive conveyor chains 28 through belts 32 and sprockets 31.

It is thus seen that the apparatus provides means for conveying a tube rack or the like in a linear path so as to present samples sequentially at various stations according to a predetermined timed program. The treatments desired to be effected are then carried out by suitable operations at the selected stations to provide the time necessary for the operations to take effect, determined by the distance between stations where the operation has begun, and the position where the operation must be completed for the next step. Thus, operations such as transfer of measured quantity of samples, additions of diluent or reagent, precipitations and digestions, and other procedures may be carried out by utilizing the desired associated equipment. The apparatus show in the drawings is particularly adapted for conducting a filtering operation to remove a component.

Thus in the apparatus shown, the samples are presented first to a transfer device 36, where a measured quantity of sample is taken up from a sample container in which the operator supplies an indefinite amount of sample, and this measured amount of sample is transferred to a clean container together with a measured quantity of reagent which is capable of precipitating a component present in the original sample. Sufficient time for this precipitation to take place is provided by placing the next station 16 a sufficient number of sample stations away from transfer device 36 to allow complete precipitation to take place. At transfer device 16, the slurry of precipitated sample is transferred to a filter apparatus which contains an upper chamber, a lower chamber and a filter means disposed therebetween. Thus, filtration takes place by gravity as the tube racks are conveyed beyond transfer device 16. After suitable time has been allowed for filtration, the filtered sample is removed by any suitable transfer device such as the transfer device 36 utilized to move sample earlier, or any of the sample transferring devices described in our copending application entitled Automatic Analytical Apparatus, Serial No. 207,124, filed July 2, 1962, and assigned to the same assignee as the present application.

It is apparent that various programming may be effected if desired, and that additional reagent dispensing units may be provided if desirable or necessary. For example, the component precipitated and filtered out may also be analyzed by providing a reagent which reacts on the precipitate to solubilize it and carry it through the filter paper to the receiving chamber. In such a situation, it is necessary first to remove the filtrate from the receiving container, and then to wash the receiving container prior to bringing in the material carrying the precipitated component down into the receiving container. Suitable wash means that could be incorporated are also described in the copending application cited above, where sample containers are moved in a cyclic path and there cleaned and dried for continuous presentation through the system.

The tube rack unit 12 may be constructed in a number of different sizes, and the number of rows or number of containers in each row may vary. The important consideration is the provision of rows of samples, with each sample adapted to follow the prior sample sequentially through a station as the rack is conveyed in the manner described above. In other words, the samples are evenly spaced and the period of advance between the stations is an adjusted constant. The rows are placed in side by side relationship so that transfers may be made from one row to an adjacenet row, or other operations such as filtration may be carried out from a given row to an adjacent row. Thus, the number and arrangement of side by side rows will vary depending upon the number and types of operations to be carried out by the apparatus. The tube rack illustrated in the present apparatus is a preferred form of rack for lineal operation, in which filtration is to be carried out along with one or more other operations. The filter block itself is the subject of our copending United States patent application, Serial No. 207,122, filed July 2, 1962, entitled Sample Conveying and Conditioning Unit, and assigned to the same assignee as the present application.

A typical form of tube rack is shown in detail in FIGURE 7, the unit having rows 37, 38, 39 and 41 disposed in parallel linear fashion, with the containers 13 of each row adapted to pass through similar positions. Any of a variety of materials may be used for making the block, but we prefer to use a moldable plastic having good physical properties and resistance to chemical attack. Thus, the block is molded as a single unit with rows 37, 38, and 39 disposed adjacent to each other and in substantially the same vertical position while row 41 is disposed below row 39. In order to provide filtration, a filter support 42 is provided at the bottom of the containers in row 39. As here shown, the support comprises ribs 43 adapted to receive a strip of filter paper 45 or the like, which fits through a slot 44 defined by the ribs and the lower wall of containers 13 in row 39. Just beneath the filter is a passage 46, adapted to carry filtered fluid from the filter into the containers 13 of row 41.

In operation, the samples are provided in the containers in row 37 by the operator without measuring the quantity of sample provided, the only requirement being that sufficient sample is provided to supply the measured amount needed. The operator then places the loaded tube rack in position on supporting means 29 of the feeding section 19. The operator also supplies sufficient reagent and adjusts the manual controls so as to carry out the desired analytical procedure. With the machine turned on, the sample moves with the tube rack from the feeding section onto the conveyor means 14 which conveys the samples sequentially in accurately timed movement through the various stations linearly disposed along the sample path.

The samples first reach the transfer device 36 which is adapted to take up a measured quantity of sample from the containers in row 37, and to deliver this measured quantity of sample, together with a measured quantity of reagent, to the containers in row 38. This operation is provided by a combination of mechanical means for moving a probe or pipette into operative positions in the containers of rows 37 and 38, in combination with pump means for taking up and delivering the sample and reagent. This transfer device is described and claimed in copending United States patent application Serial No. 207,111, filed July 2, 1962, by Hans Baruch, an inventor in the present application, and Erik W. Anthon, entitled Automatic Sample Handling Apparatus, and assigned to the same assignee as the present invention. Thus, the transfer apparatus is here claimed only as a component part of the overall combination utilized in the present apparatus.

A typical system for providing a measured quantity of sample and reagent is shown in FIGURE 8, and comprises a tube terminating in a probe or pipette 47 mounted for movement by mounting 48, pumps 49 and 51, reagent container 52 and valve 53. The valve provides communication of the pumps to either a pressure line 54 or a vacuum line 56, and also changes the positions of the tubes. A typical valve and mechanism suitable for operating the same which is particularly valuable for use as the valve 53 is described and claimed in the copending United States patent application, Serial No. 183,506 of Erik W. Anthon entitled Valve, filed March 29, 1962, and assigned to the assignee of the present application.

Both pumps 49 and 51 are similarly constructed and adapted to operate by means of air pressure or vacuum with the air pressure causing each of the pumps to move a piston or plunger in one direction, and the vacuum causing each of the pumps to move the piston or plunger in reverse direction. Thus, each pump comprises a housing 57 enclosing chambers 58 and 59, with chamber 58 adapted to activate a piston 61 attached to a plunger 62 which communicates down into chamber 59, and effects movement of liquid into and out of the chamber by altering the volume therein.

In order to accurately adjust the volume of liquid taken into the chambers 59, stop means 63 are provided to limit the movement of piston 61. In order to adjust the position of the stop means 63, the means is adjustable by rotation through a sealed threaded engagement with the housing 57 as shown in FIGURE 2. Rotation of the stop means is effected by turning knurled handle 64, and the setting may be accurately adjusted on a suitable gage 66 which may include a vernier device (not shown) or any other conventional measuring scale for providing accurate settings.

The operation of the device follows automatically from the positioning of the valve. Thus, when the valve is positioned as shown in the drawings, liquid is discharged from the probe; and when the valve is in the position shown in phantom in the drawing, liquid is taken up into the probe. Thus, when the valve is positioned as shown in phantom, the probe 47 is positioned to receive sample from a container in row 37. This is accomplished because at the beginning of this cycle of operation, the pistons 61 and associated plungers are in the lowered position and the chambers 58 of both pumps are in communication with vacuum line 56.

The pressure difference causes both plungers to move upwardly, which in turn enlarges the volume of the chamber 59. Since the lower chamber 59 is in communication only with the probe 47, a liquid representing this change of volume is drawn into the probe 47 from the sample container; and since this amount of liquid is accurately adjusted, an accurately measured amount of sample is drawn into the proble or pipette 47. At the same time, the upper chamber 59 of pump 49 is in communication with the reagent container 52 and movement of its plunger upward causes reagent to enter upper chamber 59 in an amount equal to the change in volume in that pump. In this way, a measured amount of reagent is taken into the system and a measured amount of sample is taken into the probe.

After the probe has thus received sample, it is moved into position at an adjacent sample container in row 38 by means of the mounting 48 of transfer device 36. After the probe has been moved, the valve 53 is adjusted to the position shown in solid lines. After the valve is changed, chambers 58 of both pumps are in communication with pressure line 56 which causes the pumps, pistons and associated plungers to move downwardly, thereby decreasing the volume of the chambers 59. Upper chamber 59 is now in communication with lower chamber 59 and the exit lines leading to the probe 47 so that reagent flows in this direction, the amount of reagent flow being equal to the change in volume of upper chamber 59. At the same time, the lower chamber 59 is decreased in volume to force out the sample taken up through the probe. In this way, the measured amount of sample is first discharged, and then a stream of reagent follows to wash out the probe and render it clean enough for the next operation. The various fluid lines and pump chambers are kept filled with reagent at all times, so that a measured amount of reagent is discharged after the sample, and the plungers are operating against substantially incompressible liquids.

All of the operations are indexed together, and the valve movement is effected by a single control, which control is automatically activated from the conveyor or other system by a signal at the proper time, the conveyor being moved at all times according to a fixed program of stepwise movement, with the timed duration of each step being constant during the operation of the apparatus.

A simple control circuit which could be used to provide the desired movement of the valve members, comprises a reciprocating member 67 adapted to move the valve from one position to another on reciprocation thereof, an eccentric 68 driven by motor 69 and adapted to engage a frame 71 of member 67 to effect the reciprocating movement mentioned above. On each half revolution, a hand 72 adjusts a switch 73 so as to turn off the motor after each half revolution. The motor is then turned on again by switch 74 which is indexed into the conveying mechanism 14.

Transfer device 36 also contains a mounting 48 for the probe 47, and serves to move the probe between the position shown in solid lines in FIGURE 5 where the probe is in operative position in a container row 38, and the position shown in phantom in FIGURE 5 where the probe is in operative position in a container in row 37. As best seen in FIGURES 5 and 6, the movable mounting 48 comprises a housing 76 which carries a tube 77 which is parallel to and in fluid communication with the tube of the probe 47, a sleeve 78 or the like which is secured to the tube 77 to impart movement thereto, and means 79 for moving said gripping means in the desired vertical and horizontal motion.

As here shown, the means 79 contains a rod journaled through the housing for vertical axial movement, a linkage system 82 containing arms 83, 84, 86 and 87 which are pivoted at their ends and form a parallelogram, and a trip-over device 88 adapted to force the parallelogram position of the linkage from the position shown over into the position on the opposite side where the probe and tube 77 have position as shown in phantom. This tripover device has a sub-surface 89 which is engaged by a pin 91 with pin 91 being spring-loaded with spring 92 to prevent breakage and yet supply sufficient force to cause the linkage to flip over. Thus in operation, each time the rod 81 moves vertically upward, the linkage system 82 is forced to the opposite side and the probe is moved transversely between the containers.

As best seen in FIGURE 6, rod 81 is moved vertically by its connection with a rod 93 attached to a piston 94 actuated in air cylinder 96.

The cylinder 96 is constructed with a cylindrical wall of substantially circular cross-section, and end cap 97 sealingly disposed at the upper end thereof, and an end cap 98 disposed at the lower end thereof. A spring 99 is located between piston 94 and end cap 98, and this spring is compressed as the piston is moved downward by air pressure entering the cylinder by passage 101. When the air pressure is released, spring 99 forces piston 94 upwardly to the position shown in phantom, where there is still sufficient compression in spring to insure the complete return of the piston.

Thus, it is seen that the movement of the probe is governed simply by supplying air pressure to the unit in the mounting 48 of the transfer device 36, and that the liquids are taken up and delivered simply by positioning the valve 53.

One of the important features of this invention resides in the fact that the mounting 48 may be moved with relation to the container while programming the unit in order to provide the transfer operation at any desired location. As will be seen hereinafter, this allows for the accomplishment of geometric timing means whereby the length of time a sample is positioned between two places is fixed at the desired value. This fixing is accomplished because the conveyor is adapted to provide a uniform sequence of halting and advancing of the sample stationed from one position to the next. The time duration for each step is thus the same for all steps, and the distance between sample stations is also the same so that a geometrically timed operation is provided between two given operations by the location of said given operations.

Thus, the spaced distance between transfer device 36 and transfer device 16 represents a fixed time interval. Accordingly, the two devices are spaced sufficiently apart to allow the reagent the required period of time to act before the next sequence of operations takes place. In order to provide flexibility, and to make it possible for the apparatus to carry out many different opeartions, the transfer device 16 is also mounted in such a way that it may be moved by the operator to provide the geometric timing mentioned above.

In a typical process, the reagent is added while a measured quantity of sample is transferred into position in a container in row 38. This reagent is used to precipitate a component which is to be removed from the sample or otherwise separated therefrom. Accordingly, the transfer device 16, which moves the material from the containers in row 38 to the containers in row 39, is positioned a few sequential steps beyond the point of addition of reagent. The operator makes this adjustment to provide the required procedure. On transfer of precipitated sample or slurry from the container in row 38, filtration is immediately effected in row 39.

This transfer is effected by positioning a tube 102, which is formed in inverted U-shape, so that one end of the tube communicates with the bottom of the container in row 38 and the other end of the tube communicates with a container in row 39. This tube is normally positioned above the containers, and need only be moved axially downward into operative position when transfer is to be effected.

Referring to FIGURE 3 in greater detail, there is shown a form of transfer mechanism 16 comprising a support frame 103 adapted to hold a vertical support member 104 in a position adjacent to any of the desired number of sample stations, a horizontal support arm 106 carried by the vertical support member, and a cylinder 107 carried by the arm 106.

Frame 103 contains positioning means 108 adapted to fit the lower end 109 of vertical support member 104 and provide the proper positioning at the selected station. The vertical support is then rigidly held by set screw 111. Support arm 106 is rigidly held by member 104 and cylinder 107 is rigidly held by arm 106 so as to be positioned directly above a container in the sample station in row 38.

Cylinder 107 is adapted to provide the desired vertical movement of tube 102 and to effect the transfer of liquid from the container in row 38 to the container in row 39. Thus, the cylinder 107 comprises a plunger 112 slidably mounted therein so as to move between the position shown and the position in phantom in FIGURE 3. Plunger 112 has a lower surface 113 adapted to fit in sealing engagement with the top of the container 13 of row 38 so that on downward movement of the plunger, a positive pressure may be applied into the container. Tube 102 is held in plunger 112 by a screw 114, the passage through the plunger being larger than the outside of the tube so as to leave a passage through the bottom of the plunger. This passage is small enough that a positive pressure builds up within the cylinder and yet large enough to allow air to communicate therethrough. Tube 102 is carried sealingly by an end section 116 at the upper end of cylinder 107 so that no other loss of air pressure occurs.

In operation, air pressure is provided through line 117, which pressure causes plunger 112 to move downward carrying probe 102 with it and into position. As the plunger 112 moves downward, the surface 113 provides a seal in the container 13, and air pressure then passes from within the cylinder 107 down through to passage around tube 102 and into the container to provide a superatmospheric pressure therein. This pressure then causes liquid to be forced through tube 102 so that substantially all of the liquid is so removed and passed into the container 13 of row 39. In order to transfer all of the material, it is necessary to provide a sloping bottom or some equivalent structure, and have the tube communicate to the point where all of the liquid may be removed. When the air pressure is shut off in line 117, the superatmospheric pressure within the cylinder and within the container is soon reduced by movement of excess gas through tube 102, which serves to clear the last liquid through the tube as well as to reduce this pressure. With the pressure thus reduced, spring 118 forces the plunger 112 back to the position shown in phantom. In this way, the plunger and probe tube are withdrawn so that the tube rack may be advanced to the next station.

From the foregoing description, it is seen that transfer device 16 is brought into operation simply by supplying air pressure through line 117. Acordingly, operation of transfer device 16, as well as operation of transfer device 36, may be accomplished by utilizing an additional valve structure operative with valve 53 to supply this air pressure. In this way, all of the activities described are accomplished by positioning valve 53. This position is effected when the conveyor is halted for its timed delay at each station. The return position of the valve 53 is conveniently accomplished by a time delay relay (not shown) in the valve circuit, set to provide sufficient delay to allow the pumps to operate.

In FIGURE 4, there is shown an alternative form of cylinder 107 for moving the probe in and out of operative position, and this form provides a smaller inverted U-shaped delivery tube 102 as shown in the drawing. As shown in FIGURE 4, the plunger 112 and cylinder 107 are larger than in the embodiment of FIGURE 3, and the tube 102 is held in a passage larger than its outside surface by set screw 114. The device functions in an equivalent manner to the embodiment of FIGURE 3; however, spring 118 is a tension spring instead of a compression spring. Spring 118 is supported at the upper end by a support 119 and at its lower end by the plunger 112. Thus, air pressure forces the plunger into operative position, and liquid is moved as described above until all of the liquid is moved and the air pressure is cut off. Then spring 118 retracts plunger 112, which brings tube 102 with it to clear the container and allow movement of this tube to the next station. The operation is then repeated for each advance of the tube rack.

A typical operation of the apparatus will serve to illustrate more fully the operation thereof. Such an example involves the deproteinizing of samples such as whole blood, serum or plasma to give a protein free filtrate for use in further analyses for sugar, creatinine, non-protein nitrogen and other materials. In operation, samples are provided to the containers in row 37 of a group of tube racks and the tube racks stacked into the feeding section 19. The transfer device 36 is programmed to take up and move an accurately measured quantity of sample to the containers in row 38, while simultaneously adding an accurately measured quantity of precipitating reagent, such as sulfuric acid-sodium tungstate reagent.

For example, pumps may be set up to take up and transfer 0.2 ml. of sample and 1.8 ml. of reagents. With these materials delivered into the container in row 38, precipitation of protein immediately begins to take place. In order to provide the desired length of time for the precipitation reaction to take place, the transfer unit 16 and the transfer device 36 are spaced apart a sufficient number of stations to provide geometric timing of this operation, the total time duration being positively determined by the number of steps the samples must advance multiplied by the time duration of each step which is a fixed quantity during operation of the machine.

When the sample reaches transfer device 16, the slurry is transferred over into the adjacent container in row 39, and liquid flows through the filter paper at the bottom of the container to provide the liquid sample in the container of row 41 while leaving the precipitate behind on the filter paper. The protein free sample may then be further processed by other components spaced along the conveyor. Alternatively, it may be transferred from the container in row 41 to another analytical device for carrying out the determination of the desired component.

It is also possible to provide means for adding the reagent at some station after removal of the filtrate and washing of the container. In this way, a reagent may be used for dissolving the precipitate so that an analysis may be carried out on the precipitated component.

Thus, it is seen that we have provided an apparatus capable of conducting analytical operations such as filtration in a reliable manner, and that other operations may be carried out instead of that described, or the described operation may be combined with other operations from this or additional analytical modules to provide any of a large variety of analytical procedures. In this way, these procedures are carried out in much the same fashion as they would be carried out by a laboratory technician, only more rapidly, more uniformly, and at a lower cost per determination.

We claim:

1. An apparatus for automatically conducting analytical procedural steps, comprising a plurality of sample holders, a conveyor for moving said sample holders through a linear path, said sample holders being removably mounted on the conveyor, timed drive means for driving the conveyor and advancing the sample holders through a plurality of sample stations with equal time increments for each advance from the arrival of the holders at one station to the arrival of the holders at the next station, sample conditioning means including means for adding a conditioning agent at one of said sample stations, sample treating means carried on the apparatus, sample transfer means at another of said sample stations for transferring conditioned sample to the sample treating means, and means for adjustably mounting said sample conditioning means and said sample transfer means at any of a selected number of sample stations apart to fix the time duration between these operations.

2. The apparatus defined in claim 1, in which the sample conditioning means comprises means for adding a reagent capable of precipitating a constituent in the sample and the sample treating means includes a filter.

3. An apparatus for automatically conducting analytical procedural steps, comprising a plurality of rows of sample holders, a conveyor for moving said rows of sample holders through a linear path, said sample holders being removably mounted on the conveyor, timed drive means for driving the conveyor and advancing the sample holders through a plurality of sample stations with equal time increments for each advance from the arrival of the holders at one station to the arrival of the holders at the next station, a transfer device mounted at a sample station, said transfer device being capable of taking up sample from a sample holder in one row of containers and discharging a measured quantity of sample into a container of another row of sample containers, sample conditioning means at one of said sample stations, sample treating means at another of said sample stations, and means for adjustably mounting said sample conditioning means and said sample treating means at any of a selected number of sample stations apart to fix the time duration between these operations.

4. An apparatus for automatically conducting analytical procedural steps, comprising a plurality of sample holders, a conveyor for moving said sample holders through a linear path, said sample holders being removably mounted on the conveyor, timed drive means for driving the conveyor and advancing sample holders through a plurality of sample stations with equal time increments for each advance from the arrival of the holders at one station to the arival of the holders at the next station, a transfer device capable of moving a probe from an operative position in a sample holder containing sample to an operative position in another sample holder at one of said sample stations, said transfer device including a pump means capable of taking up a measured quantity of liquid in the probe from the sample holder when the probe is in operative position in said sample holder and delivering the liquid when the probe is in operative position at another sample holder, said pump means also being capable of automatic washing whereby sample is transferred in the probe in a form which is substantially free from contamination by prior liquids transferred, reagent delivery means at one of said sample stations for adding reagent to the samples, sample treating means at another of said sample stations, and means for adjustably mounting said reagent delivery means and said sample treating means at any selected number of sample stations apart to fix the time duration between these operations.

5. An apparatus for automatically conducting analytical procedural steps, comprising a plurality of sample holders, a conveyor for moving said sample holders through a linear path, said sample holders being removably mounted on the conveyor, timed drive means for driving the conveyor and advancing the sample holders through a plurality of sample stations with equal time increments for each advance from the arrival of the holders at one station to the arival of the holders at the next station, a transfer device capable of moving a probe from an operative position in a sample holder containing sample to an operative position in another sample holder at one of said sample stations, said transfer device including a pump means capable of taking up a measured quantity of liquid in the probe from the sample holder when the probe is in operative position in said sample holder and delivering liquid when the probe is in operative position at another sample holder, said pump means also being capable of transferring a measured quantity of additional liquid through the probe after delivery of said sample liquid whereby the probe is washed clean of said liquid sample to prevent contamination of the next sample to be taken up, conditioning means including means for adding a conditioning agent at one of said sample stations, sample treating means carried on the apparatus, sample transfer means adjustably mounted on the apparatus at another of said sample stations for transferring samples to the sample treating means, and means for adjustably mounting said sample conditioning means and said sample transfer means at any selected number of sample stations apart to fix the time duration between these operations.

6. An apparatus for automatically conducting analytical procedural steps, comprising a plurality of rows of sample holders, one of said rows of sample holders being carried above another of said rows of sample holders, connecting passages between the sample holders of said row carried above communicating downwardly to sample holders below, a conveyor for moving said sample holders through a linear path, said sample holders being mounted on the conveyor for easy removal therefrom, drive means for driving the conveyor and advancing the sample holders through a plurality of sample stations, and means carried in said connecting passages for separating a component from the sample.

7. An apparatus for automatically conducting analytical procedural steps, comprising a plurality of rows of sample holders, one of said rows of sample holders being carried above another of said rows of sample holders, connecting passages between the sample holders of said row carried above communicating downwardly to sample holders below, a conveyor for moving said sample holders through a linear path, said sample holders being mounted on the conveyor for easy removal therefrom, drive means for driving the conveyor and advancing the sample holders through a plurality of sample stations, means for adding a reagent to the sample for precipitating a component in the sample, and means carried in said connecting passages for separating precipitated component from the sample.

8. An apparatus for automatically conducting analytical procedural steps, comprising a plurality of sample holders, a conveyor for moving said sample holders through a linear path, timed drive means for driving the conveyor and advancing the sample holders through a plurality of sample stations with equal time increments for each advance from the arrival of the holders at one station to the arrival of the holders at the next station, means for adding a reagent to the sample for precipitating a component in the sample, means for separating the precipitated component from the sample, and means for adjustably mounting the means for adding a reagent for precipitating the component and the means for separating the precipitated component at any of a selected number of sample stations apart to fix the time duration between these operations.

9. An apparatus for automatically conducting analytical procedural steps, comprising a plurality of sample holders, a conveyor for moving said sample holders through a linear path, timed drive means for driving the conveyor and advancing the sample holders through a plurality of sample stations with equal time increments for each advance from the arrival of the holders at one station to the arrival of the holders at the next station, a transfer device capable of moving a measured quantity of sample into a container at a sample station, means for adding a reagent to the sample at the sample stations for precipitating a component in the sample, means for separating the precipitated component from the sample, and means for adjustably mounting the means for adding a reagent for precipitating the component and the means for separating the precipitated component at any of a selected number of sample stations apart to fix the time duration between these operations.

10. An apparatus for automatically conducting analytical procedural steps, comprising a plurality of sample holders, a conveyor for moving said sample holders through a linear path, timed drive means for driving the conveyor and advancing the sample holders through a plurality of sample stations with equal time increments for each advance from the arrival of the holders at one station to the arrival of the holders at the next station, a transfer device capable of moving a probe from an operative position in a sample holder containing sample to an operative position in another sample holder at one of said sample stations, a pump means capable of taking up a measured quantity of liquid in the probe from the sample holder when the probe is in operative position in said sample holder and delivering the liquid when the probe is in operative position at another sample holder, said pump means also being capable of transferring liquid in the probe in a form which is substantially free from contamination by prior liquids transferred, means for adding a reagent to the sample at the sample stations for precipitating a component in the sample, and means for separating the precipitated component from the sample.

11. An apparatus for automatically conducting analytical procedural steps, comprising a plurality of sample holders, a conveyor for moving said sample holders through a linear path, timed drive means for driving the conveyor and advancing the sample holders through a plurality of sample stations with equal time increments for each advance from the arrival of the holders at one station to the arrival of the holders at the next station, a transfer device capable of moving a probe from an operative position in a sample holder containing sample to an operative position in another sample holder at one of said sample stations, a pump means capable of taking up a measured quantity of liquid in the probe from the sample holder when the probe is in operative position in said sample holder and delivering the liquid when the probe is in operative position at another sample holder, said pump means also being capable of transferring a measured quantity of additional liquid through said probe after delivery of said sample liquid whereby the probe is washed clean of said liquid sample to prevent contamination of the next sample to be taken up, said additional liquid being capable of precipitating a component in the sample, and means for separating the precipitated component from the sample.

12. An apparatus for automatically conducting analytical procedural steps, comprising tube racks having a plurality of rows of sample holders for holding a plurality of samples in equally spaced relation along a line, one of said rows of sample holders being carried above another of said rows of sample holders, connecting passages between the sample holders of said row carried above communicating downwardly to sample holders below, a conveyor for moving said tube rack in a direction such that the samples move through a linear path, said tube racks being mounted on the conveyor for easy removal therefrom, timed drive means for driving the conveyor and advancing the sample holders through a plurality of sample stations with equal time increments for each advance from the arrival of the holders at one station to the arrival of the holders at the next station, means for adding reagent to the sample for precipitating a component in the sample, and a filter carried in said connecting passages for separating the precipitated component from the sample.

13. An apparatus for automatically conducting analytical procedural steps, comprising tube racks having a plurality of rows of sample holders for holding a plurality of samples in equally spaced relation along a line, one of said rows of sample holders being carried above another of said rows of sample holders, connecting passages between the sample holders of said row carried above communicating downwardly to sample holders below, a conveyor for moving said tube racks in a direction such that the samples move through a linear path, said tube racks being mounted on the conveyor for easy removal therefrom, timed drive means for driving the conveyor and advancing the samples through a plurality of sample stations with equal time increments for each advance from the arrival of the samples at one station to the arrival of the samples at the next station, means for adding reagent to the sample for precipitating a component in the sample, a filter carried in said connecting passages for separating the precipitated component from the sample, and means for adjustably mounting the means for precipitating the component and the means for separating the precipitated component at any of a selected number of sample stations apart to fix the time duration between these operations.

14. An apparatus for automatically conducting analytical procedural steps, comprising tube racks for holding a plurality of samples in equally spaced relation along a line, a conveyor for moving said tube racks in a direction such that the samples move through a linear path, timed drive means for driving the conveyor and advancing the samples through a plurality of sample stations with equal time increments for each advance from the arrival of the samples at one station to the arrival of the samples at the next station, a transfer device adjustably mounted on the apparatus and capable of moving a probe from an operative position in a sample holder containing sample to an operative position in another sample holder at one of said sample station, said transfer device including a pump means capable of taking up a measured quantity of sample in the probe from the sample holder when the probe is in operative position in said sample holder and delivering the sample when the probe is in operative position at another sample holder, said pump means also being capable of automatic washing whereby sample is transferred in the probe in a form which is substantially free from contamination by prior samples transferred, means for introducing a reagent into the sample for precipitating a component in the sample, a filter carried on each tube rack for separating the precipitated component from the sample, and a second transfer means mounted on the apparatus for moving the precipitated sample to the filter.

15. An apparatus for automatically conducting analytical procedural steps, comprising tube racks for holding a plurality of samples in equally spaced relation along a line, a conveyor for moving said tube racks in a direction such that the samples move through a linear path, timed drive means for driving the conveyor and advancing the samples through a plurality of sample stations with equal time increments for each advance from the arrival of the samples at one station to the arrival of the samples at the next station, a transfer device adjustably mounted on the apparatus and capable of moving a probe from an operative position in a sample holder containing sample to an operative position in another sample holder at one of said sample stations, said transfer device including a pump means capable of taking up a measured quantity of sample in the probe from the sample holder when the probe is in operative position in said sample holder and delivering the sample when the probe is in operative position at another sample holder, said pump means also being capable of automatic washing whereby sample is transferred in the probe in a form which is substantially free from contamination by prior samples transferred, means for introducing a reagent into the sample for precipitating a component in the sample, to form a slurry, means for transferring the slurry to a slurry receiving tube, said means for introducing a reagent and means for transferring the slurry being movable on the apparatus for positioning at any of a selected number of sample stations apart to fix the time duration between these operations, and a filter carried in said tube rack in the slurry receiving tube for separating the precipitated components from the remainder of the sample.

References Cited by the Examiner

UNITED STATES PATENTS

| 2,624,656 | 1/53 | Andrews et al. | 23—259 |
| 3,081,158 | 3/63 | Winter | 23—253 |
| 3,098,719 | 7/63 | Skeggs | 23—253 |

MORRIS O. WOLK, *Primary Examiner.*

DELBERT E. GANTZ, *Examiner.*

Dedication 3,193,359.—*Hans Baruch*, Berkeley, and *Dalny Travaglio*, Kensington, Calif. APPARATUS FOR CONDUCTING ANALYTICAL PROCEDURAL STEPS. Patent dated July 6, 1965. Dedication filed Mar. 2, 1970, by the assignee, *American Optical Corporation*.

Hereby dedicates the remaining term of said patent to the Public.
[*Official Gazette July 7, 1970.*]